Figure 1:
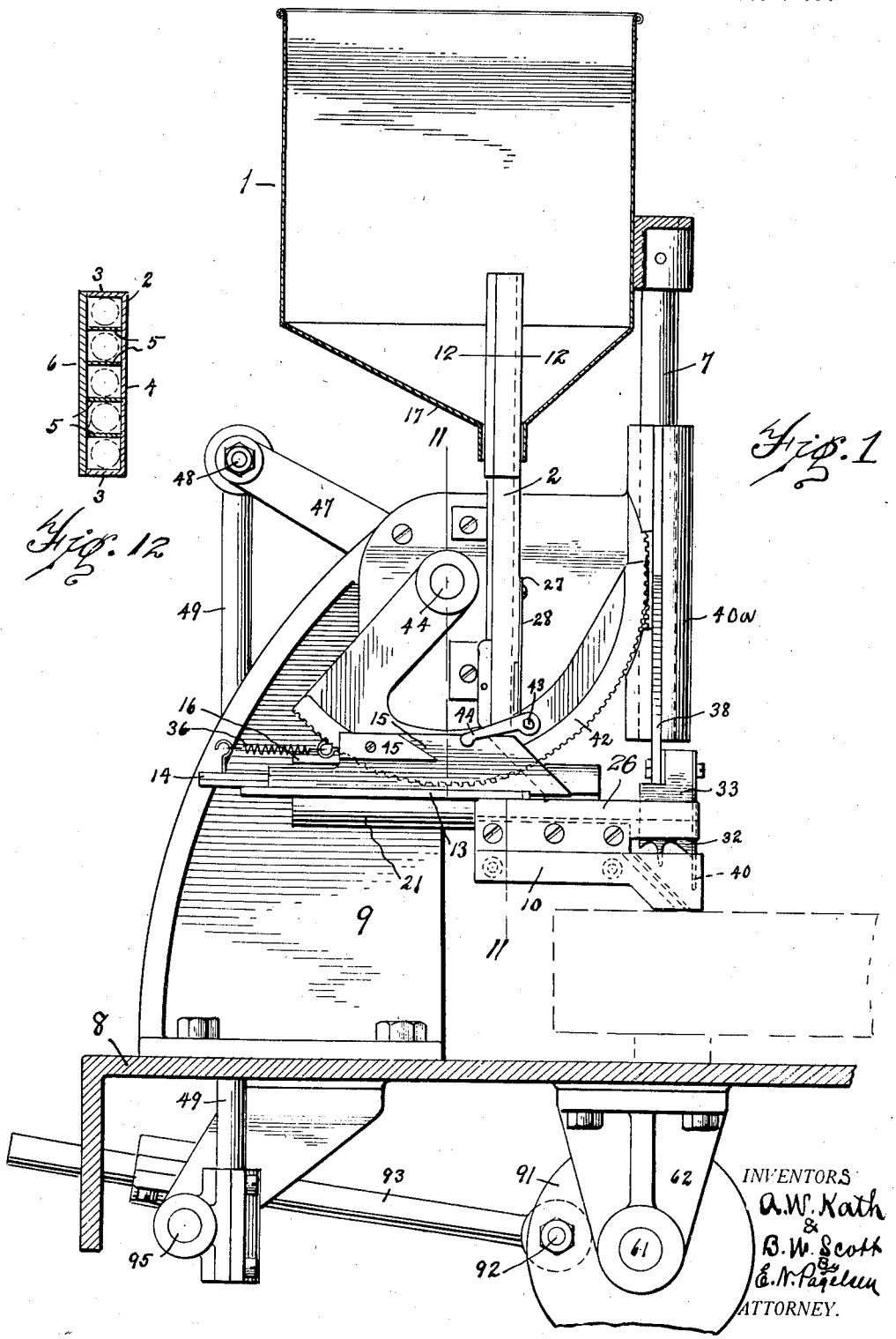

July 14, 1925.

A. W. KATH ET AL 1,545,777

CAPSULE DECAPPING MACHINE

Filed Aug. 25, 1924 6 Sheets-Sheet 1

July 14, 1925.

A. W. KATH ET AL 1,545,777

CAPSULE DECAPPING MACHINE

Filed Aug. 25, 1924

6 Sheets-Sheet 3

INVENTORS.

BY A. W. Kath & B. W. Scott.

Edward N. Pagelsen,
ATTORNEY.

July 14, 1925.

A. W. KATH ET AL

CAPSULE DECAPPING MACHINE

Filed Aug. 25, 1924

1,545,777

6 Sheets-Sheet 5

INVENTOR.
A. W. Kath & B. W. Scott
BY
Edward N. Pagelsen,
ATTORNEY.

July 14, 1925.
A. W. KATH ET AL
1,545,777
CAPSULE DECAPPING MACHINE
Filed Aug. 25, 1924      6 Sheets-Sheet 6
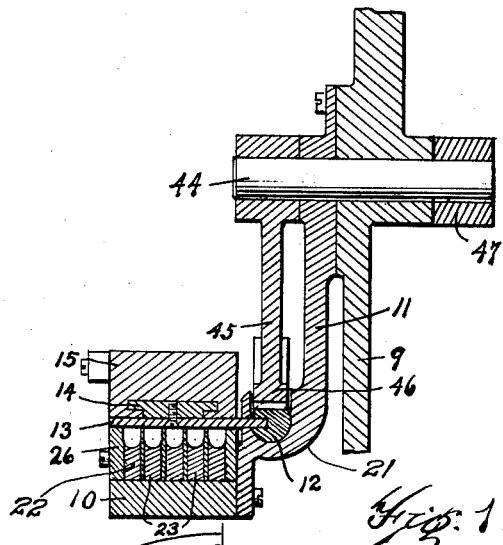
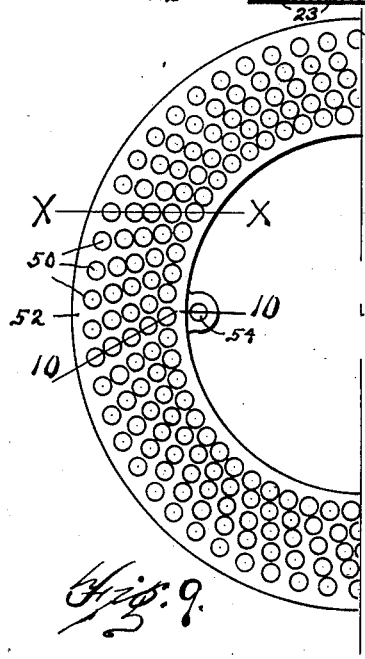
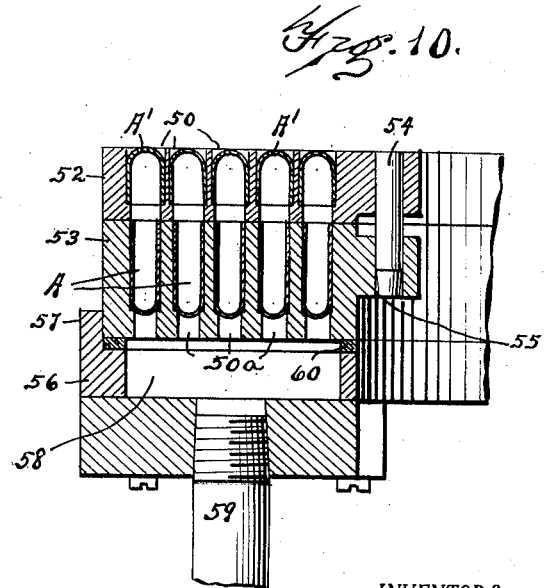
INVENTORS.
A. W. Kath & B. W. Scott
BY Edward N. Pagelsen,
ATTORNEY.

Patented July 14, 1925.

1,545,777

UNITED STATES PATENT OFFICE.

ALFRED W. KATH AND BURTON W. SCOTT, OF DETROIT, MICHIGAN, ASSIGNORS TO ARTHUR COLTON COMPANY, OF DETROIT, MICHIGAN, A CORPORATION OF MICHIGAN.

CAPSULE-DECAPPING MACHINE.

Application filed August 25, 1924. Serial No. 734,140.

*To all whom it may concern:*

Be it known that we, ALFRED W. KATH and BURTON W. SCOTT, citizens of the United States, and residents of Detroit, in the county of Wayne and State of Michigan, have invented a new and Improved Capsule-Decapping Machine, of which the following is a specification.

This invention relates to means for placing capped capsules, body-end down, in a proper two part holder and then decapping the capsule, and its object is to provide a mechanism for arranging the capped capsules end to end in a series of parallel passages or guides, sliding the bottom capsule of each guide or passage into horizontal position between holding plates, turning the capsules to upright position with their caps uppermost, and forcing and guiding the capsules down into a two part holder, one part for the bodies and the other for the caps, by sucking the bodies out of the caps into the part of the holder for the bodies, leaving the caps in the other part of the holder.

This invention consists in a hopper for the capped capsules, a series of guides leading therefrom, means for removing the lowermost capsule from each guide and for carrying it to a point between a pair of plates which are so spaced that the dome shaped closed ends of the caps of the capsules are tightly held thereby, and means for pressing down on the capped capsules so that they will assume vertical positions with their caps uppermost.

It also consists of means for pushing these properly positioned capsules down from between the suporting plates into another set of guides so that they may slide into proper position above the holes in a two part carrier disk.

It also consists in a two part carrier disk having a seies of rows of holes, the holes of each series adapted to register with a suction slot in a supporting table, the holes in the upper part of the disk being of sufficient size to receive the caps but the holes in the lower part being only large enough to receive the bodies of the capsules which may be sucked down out of the caps into this lower part of the carrier disk.

It further consists of the operating mechanism for the various parts and the details of construction illustrated in the accompanying drawings and particularly pointed out in the claims.

Figure 2:
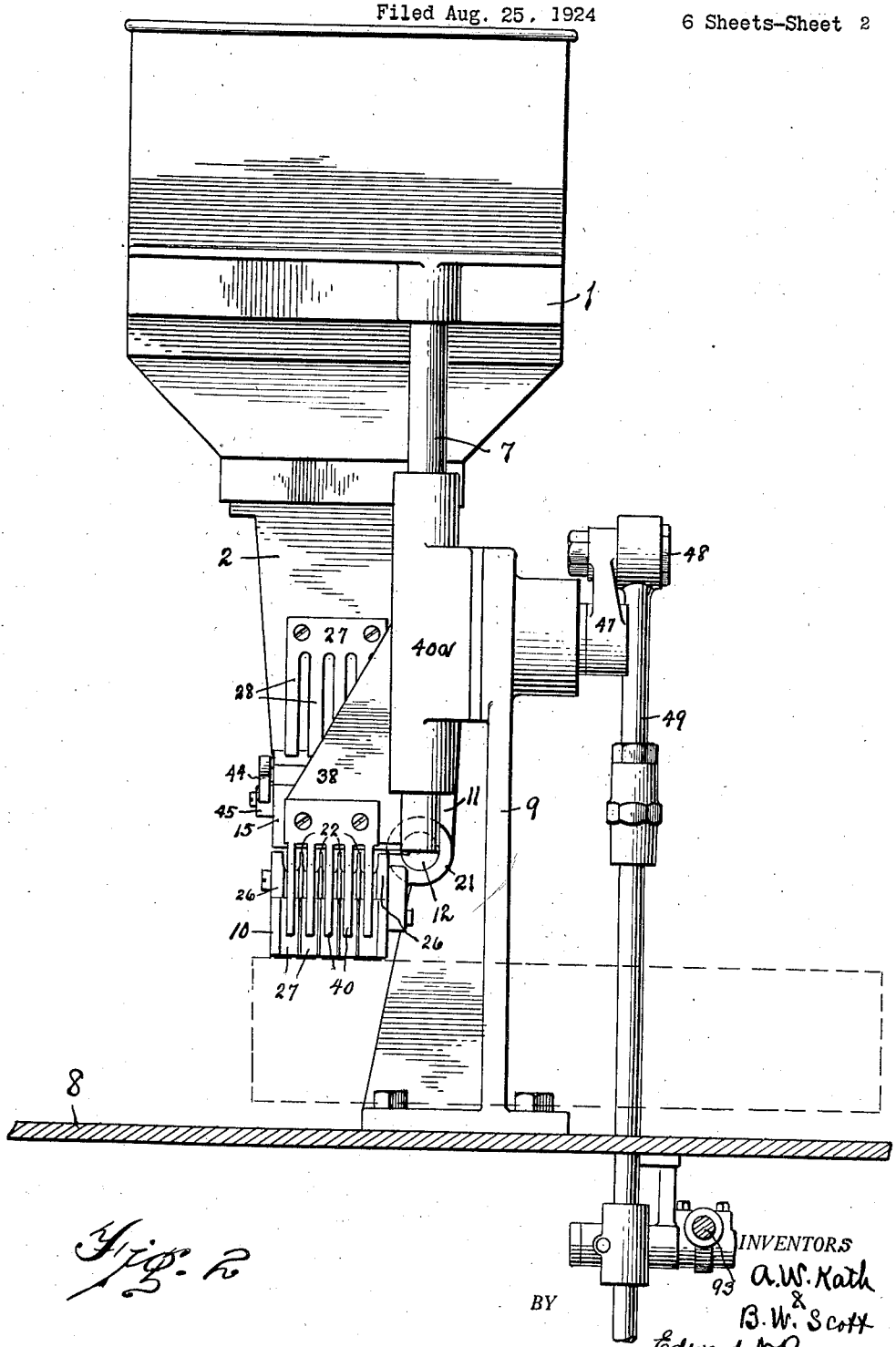
Figure 3:
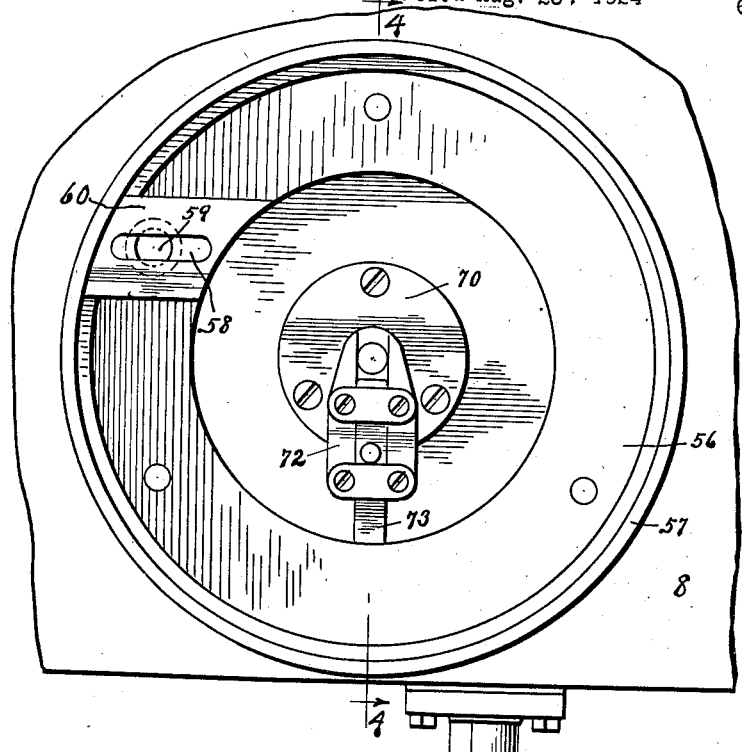
Figure 4:
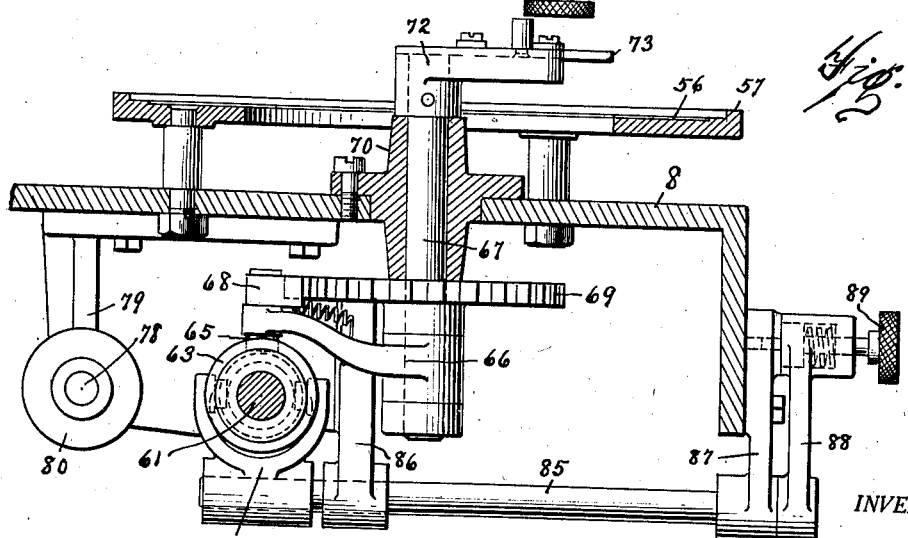
Figure 5:
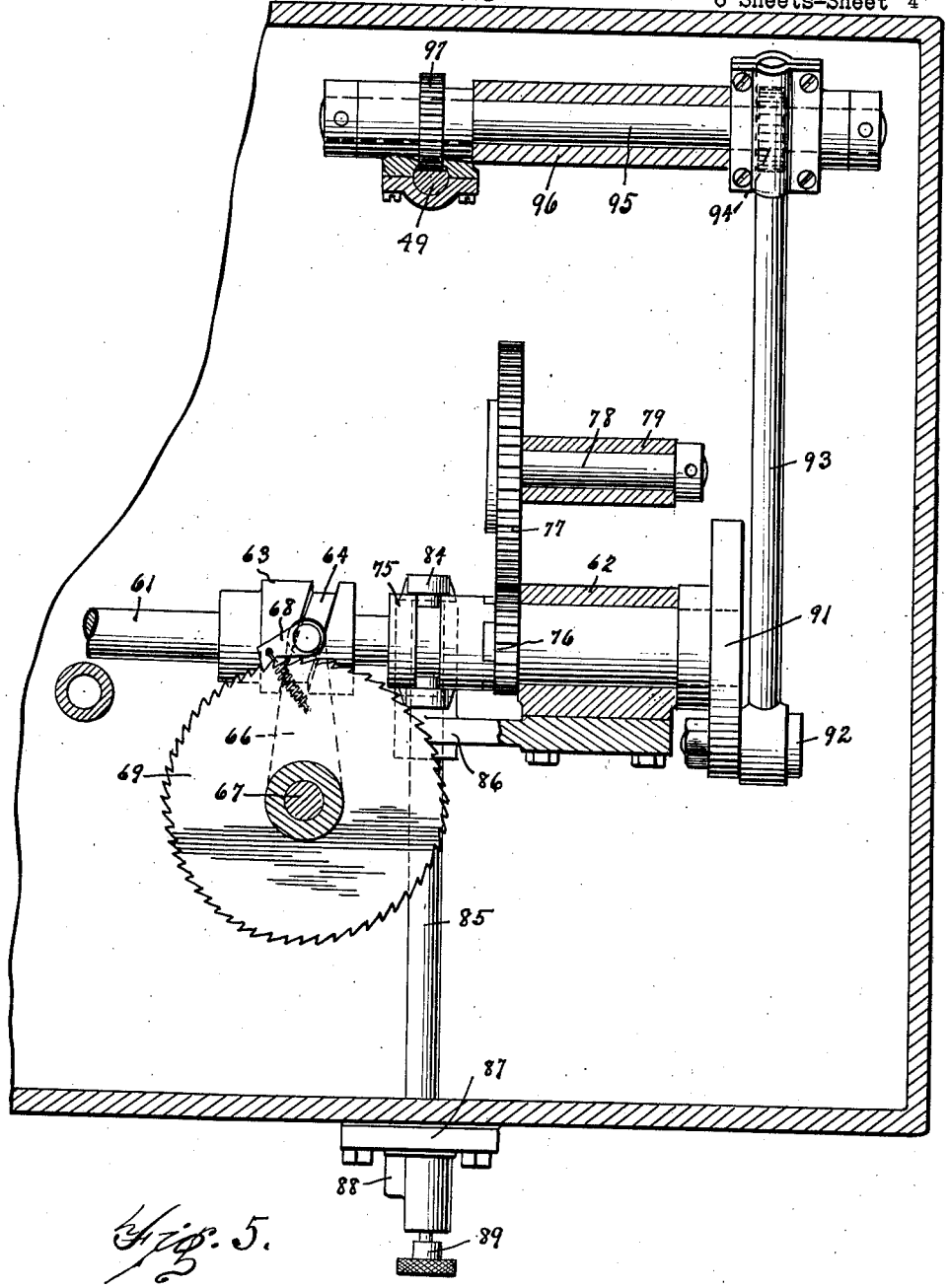
Figure 6:
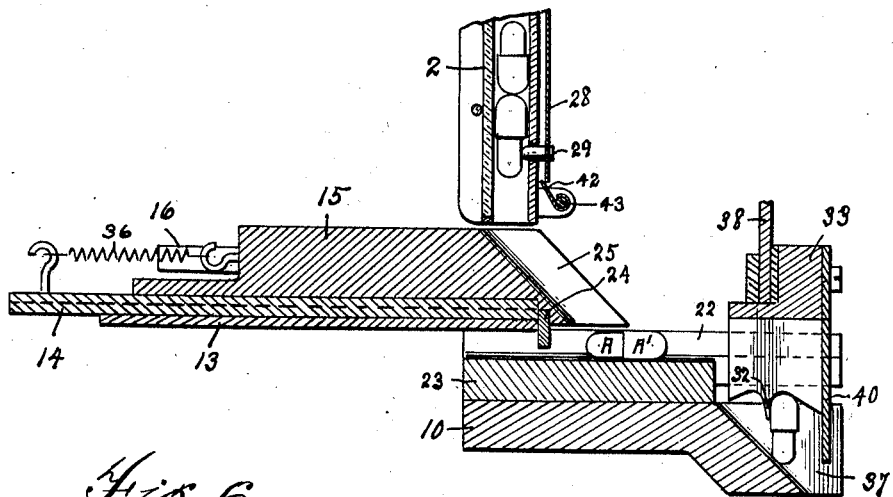
Figure 7:
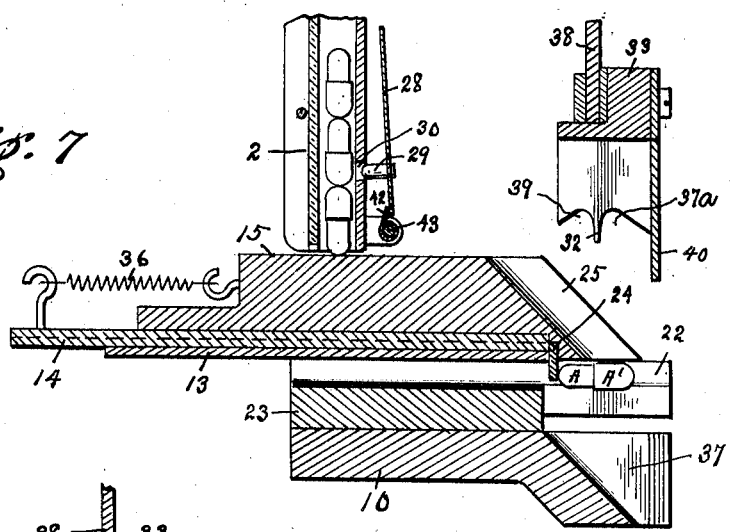
Figure 8:
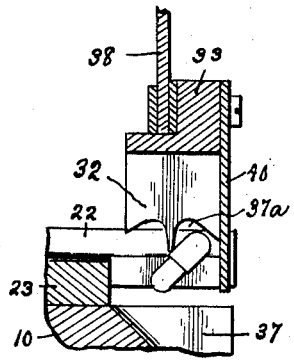

In the drawings, Fig. 1 is a side elevation of a capsule positioning machine embodying our present invention. Fig. 2 is a front view thereof, Fig. 3 is a plan of the supporting table for the carrier disk and Fig. 4 is a section on the line 4—4 of Fig. 3. Fig. 5 is a plan of the driving mechanism for the several parts. Figs. 6, 7 and 8 are sections on a larger scale illustrating the construction and operation of the means for placing the capsule in proper position in the guide tubes leading to the capsule carrier. Fig. 9 is a half plan of a capsule carrier. Fig. 10 is a section on the line 10—10 of Fig. 9. Figs. 11 and 12 are sections on the lines 11—11 and 12—12 of Fig. 1, respectively.

Similar reference characters refer to like parts throughout the several views.

The capsules A are dumped into a hopper 1 which is slidable on a vertical chute 2 consisting of the sides 3, back 4, division plates 5 and front plate 6, and the chute is funneled at its upper end if desired. The hopper is attached to a vertically movable rack bar 7 whose movement will be described later on. It is lifted sufficiently high at each cycle of the machine that the lower end of its bottom 17 comes just above the upper end of the chute, so as to permit the capsules to slide down in the guide passages in the chute. This movement also agitates the capsules so that they slide down into this guide passage in the spout. This hopper and the other parts just described are mounted on a flat pedestal 9 which rests on a main table 8.

The pedestal 9 supports a short horizontal guide table 10 and a guide 21, both carried by the bracket 11, (Fig. 11), in which guide a round rack bar 12 is longitudinally slidable. An actuating plate 13 is attached to this rack bar and has a guide 14 attached to it and the carriage 15 is slidable on the plate 13. A small stop 16 is attached to the pedestal above the rear end of the guide 21 to limit the rearward movement of the carriage 15. The table 10 supports the plates 22 and the spacers 23 between them. The fingers 24 on the carriage 15 extend down between these plates. The outer side plates are numbered 26. The carriage has an inclined front end formed with grooves 25 to receive the capsules A.

The vertical longitudinal plates 22 are so spaced that they grip the dome-shaped closed ends of the caps A' of the capsules. While these capsules are fragile, still the closed ends of the cap may be gripped sufficiently hard to hold the capsule in any desired position. A plate 27 of resilient metal is mounted on the front side at the lower end of the vertical spout 2 and is formed into fingers 28 which carry pins 29 adapted to enter the holes 30 in the front plate of the chute 2 and normally extend into the path of the capsules A. These spring fingers are swung out to permit a capsule to fall by means of a plate 42 mounted on a small shaft 43 carried by the spout just below the fingers 28. An arm 44 on this shaft is engaged by the inclined block 45 attached to the carriage 15 at each forward movement of the carriage at such a time that one capsule can slide down onto the carriage out of each passage in the chute, as shown in Fig. 7.

Fig. 6 shows the carriage at the rear end of its stroke. A capsule has slipped from each passage down the grooves 25 into the spaces between the plates 22 on the table 10. The spring 36 has pulled the carriage 15 back against the stop 16 and the fingers 28 are holding back all the other capsules. The actuating plate 13 continues to move back, stretching the spring 36 while the capsules slide down to position and then moves forward. Its front end strikes the fingers 24 and thereby pushes forward the carriage which actuates the plate 42 and the fingers 28 and permits the capsules in the chute to slip down and at the same time causes the fingers 24 to move the capsules to the position shown in Fig. 7 where they will be held by the plates 22. The parts then move back to the positions shown in Fig. 6, the carriage moving back under the pull of the spring 36 until it reaches the stop 16.

The caps of the capsules may be at the left or at the right ends in Fig. 7, but the fingers 24 leave the capsule centrally below the blades 32 on the head 33 which moves vertically up and down between the positions shown in Figs. 6 and 7, reaching the upper position when the carriage 15 has carried the capsules farthest forward. When these blades come down and touch the capsules, as shown in Fig. 8, the capsules are turned on the edges of the domed ends of the caps to vertical position. If the caps are outward, as shown in Fig. 7, the blades swing down the bodies counter-clockwise and these blades receive the caps in the outer notches 37ᵃ and push the capsules down, as shown in solid lines in Fig. 6. But if the caps are inward, the capsules swing clockwise so that the caps are received by the inner grooves 39 and the capsules again move down to the grooves 37, cap-end up.

It is therefore immaterial whether the capsules pushed along by the fingers 19 have their caps or bodies turned outwardly when engaged by the blades 32, the friction of the plates 22 on the stiffer ends of the caps retards those ends so that the capsules turn to vertical position, cap up, and in that position moved down to the grooves 37. The small plates 40 at the outer edges of the plates prevent the capsules from escaping when being turned.

Any desired mechanism may be employed to move the head 33 up and down but we prefer to attach a vertical web 38 to this head and to the round rack-bar 7 which is slidable in a tubular guide 40ᵃ attached to the pedestal 9. This rack-bar is engaged by the segmental gear 42 mounted on a shaft 44, and this segmental gear also meshes with the rack-bar 12. A crank-arm 47 on this shaft carries a pin 48 which is engaged by the upper end of a rack-bar 49 which swings this crank arm up and down at each cycle of the machine.

The capsules slide down the inclined guide grooves 37 in the table 10 until their ends are at the upper ends of the holes 50—50ᵃ in the capsule carrier. This carrier is formed of two rings 52 and 53, which register because of the pins 54 in one extending into holes 55 in the other. The holes 50 in the upper ring are sufficiently large to receive the cap while the holes 50ᵃ receive only the bodies.

The capsule carrier is placed upon a stationary circular table 56 having a circumferential flange 57 to position the carrier. At one point, preferably just below and in alinement with the grooves 37, and just below the row 10—10 of holes indicated in Fig. 9, the table has a slot 58 which connects with a suction tube 59 so that when the ends of the capsule bodies enter the holes 50, suction will pull the bodies into the holes 50ᵃ leaving the caps in the holes 50, as shown in Fig. 10. These holes 50 and 50ᵃ are shouldered to stop the caps and bodies as shown in Fig. 10. In order to prevent leakage we prefer to form this slot 58 in a separate plate of metal 60 which is let into the table 56 and can be replaced when worn. The holes 50—50ᵃ are in straight lines or rows and each row is at the same angle to a diametrical line as the slot 58 and will therefore register with the slot. Any desired means may be employed to cut off the suction at each cycle of the machine until after the capsules have entered the holes 50.

The operating mechanism for this machine is mounted on the lower side of the table 8. Any desired means may be employed to turn the main shaft 61 which may be journaled in a bracket 62 extending down from the table 8. This shaft makes one turn for each cycle of the machine. On it is mounted a cam 63 having a circumferential groove 64 which receives a pin 65 on the arm 66 which is pivoted on the vertical shaft 67. A spring held pawl 68 on the arm 66 engages the teeth of the ratchet wheel 69 secured to this shaft 67. This wheel has one tooth for each row of holes 50 in the capsule carrier.

The shaft 67 may be mounted in a spool 70 (Fig. 4) secured to the table 8 and has a crank 72 at its upper end in which the blade 73 is slidably mounted to engage a pin 54 of the capsule carrier which can slide around on the table 56 the circumferential distance between two rows of holes 50 at each rotation of the main shaft 61. On the main shaft is a clutch member 75 adapted to be moved into and out of engagement with the pinion 76 which is loose on the main shaft. This pinion meshes with a gear 77 on the shaft 78 which may be journaled in a bracket 79 depending from the table 8. A fork 84 of usual construction engages the clutch member 75 and is mounted on a shaft 85 which may be carried by brackets 86 and 87. A crank arm 88 on the outer end of this shaft 85 carries a spring-held pin 89 whereby the clutch member may be held in engaged or disengaged position so that the agitator wheel may be driven or not as may be desired.

On the end of the main shaft 61 is a crank 91 having a pin 92 on which one end of a rack bar 93 is mounted. This rack bar meshes with the gear 94 on the shaft 95 which may be carried by the bracket 96. On the opposite end of this shaft 95 is a pinion 97 which meshes with the rack bar 49 whose upper end connects to the pin 48 on the crank arm 47 so that at each rotation of the main shaft the shaft 95 turns back and forth and the rack bars 12 and 7 also move back and forth.

At successive rotations of the main shaft, therefore, a set of capsules is taken from the spout 2, slid over to the proper position between the plates 22, tipped cap-up by means of the tongue 32 to vertical position, pushed down into the grooves 37, down which they slide and are sucked into the holes 50 and 50ᵃ in the carrier.

After the carrier is filled the machine is stopped and another carrier positioned on the table 56. The top ring of the filled carrier is then removed and the lower ring placed in a proper machine (not shown) where the capsules are filled. Thereafter the two rings are again joined and placed over a second machine (not shown) which embodies a large number of pins which push up through the holes 50ᵃ to force the capsule bodies into the caps and thereafter by a continued movement force the capped capsules out of the carrier.

The details of this decapping machine may all be changed by those skilled in the art without departing from the spirit of our invention as set forth in the following claims.

We claim:—

1. In a capsule decapping machine, a hopper for the capsules, a series of guide troughs connecting to the bottom of the hopper, a supporting table at the lower ends of said troughs and having parallel grooves, and a carriage adapted to receive the capsules from said troughs and move them to and guide them into said grooves.

2. In a capsule decapping machine, a hopper for the capsules, a series of guide troughs connecting to the bottom of the hopper, a supporting table at the lower ends of said troughs and having parallel grooves, and a carriage adapted to receive the capsules from said troughs and move them to and guide them into said grooves, said carriage having inclined grooves adapted to aline with said troughs for that purpose.

3. In a capsule decapping machine, a hopper for the capsules, a series of guide troughs connecting to the bottom of the hopper, parallel plates mounted below said troughs and spaced apart sufficiently to receive the capsules, and a carriage adapted to receive the capsules and carry them to and move them along between said plates.

4. In a capsule decapping machine, a series of parallel plates spaced to grip the capped ends of capsules, means to move the capsules longitudinally into position between the plates, means to engage the capsules between their ends to turn them on the outer ends of their caps as a pivot and to move the capsules from between the plates.

5. In a capsule decapping machine, a series of parallel plates spaced to grip the capped ends of capsules, means to move the capsules longitudinally into position between the plates, means to engage the capsules between their ends to turn them on the outer ends of their caps as a pivot, means to move the capsules longitudinally between the plates and means to move the capsules endwise from between the plates.

6. In a capsule decapping machine, a series of parallel plates spaced to grip the capped ends of capsules, means to move the capsules longitudinally into position between the plates, a series of guides adjacent the spaces between the plates, and means to engage the capsules between their ends to turn them on the outer ends of their caps as a pivot and to move the capsules between the plates into the spaces between the guides.

7. In a capsule decapping machine, a series of troughs of proper width to guide capsules longitudinally, means to cause capsules to enter the upper ends of the troughs, a table at the lower ends of the troughs and having longitudinal grooves, a carriage slidable on the table and having inclined grooves adapted to register with said troughs and the grooves in the table to guide capsules from the troughs to the grooves in the table, a series of parallel plates alined with the walls between the grooves in the table, means on the carriage to move the capsules longitudinally from said grooves in the table to the spaces between the plates, and means to turn the capsules between the plates and to move them out from between the plates.

8. In a capsule decapping machine, a rotatable capsule carrier comprising two parts formed with rows of registering holes of different sizes, means to rotate the carrier, means to direct a series of capsules to each row of holes as it reaches a predetermined position to cause the bodies of the capsules to enter such row of larger holes of one portion of the carrier, and means to direct a suction to the opposite ends of the smaller holes of that row to pull the bodies into said smaller holes out of the caps and to pull the caps into said larger holes.

9. In a capsule decapping machine, a capsule carrier comprising two parts formed with rows of registering holes of different sizes, means to direct a series of capsules to each row of holes as it reaches a predetermined position to cause the bodies of the capsules to enter such row of larger holes of one portion of the carrier, and means to direct a suction to the opposite ends of the smaller holes of that row to pull the bodies into said smaller holes out of the caps and to pull the caps into said larger holes.

10. In a capsule decapping machine, a rotatable capsule carrier comprising two parts formed with rows of registering holes of different sizes, means to rotate the carrier, means to direct a series of capsules to the entrance ends of each row of the larger holes as it reaches a predetermined position, means to direct a suction to the opposite ends of the smaller holes of that row to pull the bodies into said smaller holes out of the caps and to pull the caps into said larger holes, said means to direct the capsules comprising a guide for each hole in a row, and means to position the capsules in said guide with their capped ends farthest from the carrier.

11. In a capsule decapping machine, a rotatable capsule carrier comprising two parts formed with rows of registering holes of different sizes, means to rotate the carrier, means to direct a series of capsules to each row of holes as it reaches a predetermined position, means to direct a suction to the opposite ends of the smaller holes of that row to pull the bodies into said smaller holes out of the caps and to pull the caps into said larger holes, and a table to slidably support the carrier and provided with a slot to which the suction device is connected, said slot being so positioned as to register with a row of holes when suction is applied.

12. In a capsule decapping machine, means to receive a group of capsules, means to turn the capsules in the receiver so that their caps and bodies will all be in the same general positions, a capsule carrier, and means to move the capsules toward said carrier.

13. In a capsule decapping machine, a series of parallel plates, means to place capsules between the plates to be held by friction in a horizontal plane, a series of vertically movable plates adapted to engage the capsules between their ends and turn them on the closed ends of their caps as pivots to vertical position, a series of vertical tubes, and means to move the capsules from between the parallel plates into said tubes.

14. In a capsule decapping machine, a capsule holder having holes of two diameters to receive the capsules and the caps therefor, and a suction device to draw the bodies of the capsules out of the caps into the smaller portions of the holes.

15. In a capsule decapping machine, a series of parallel plates, means to place capsules between the plates to be held by friction means adapted to engage the capsules between their ends and turn them on the closed ends of their caps as pivots, and means to move the capsules from between the parallel plates.

ALFRED W. KATH.
BURTON W. SCOTT.